Oct. 16, 1962    S. A. CLAYPOOLE    3,058,323
METHOD OF SEPARATING DEVITRIFIED GLASS SEALS
Filed March 24, 1958
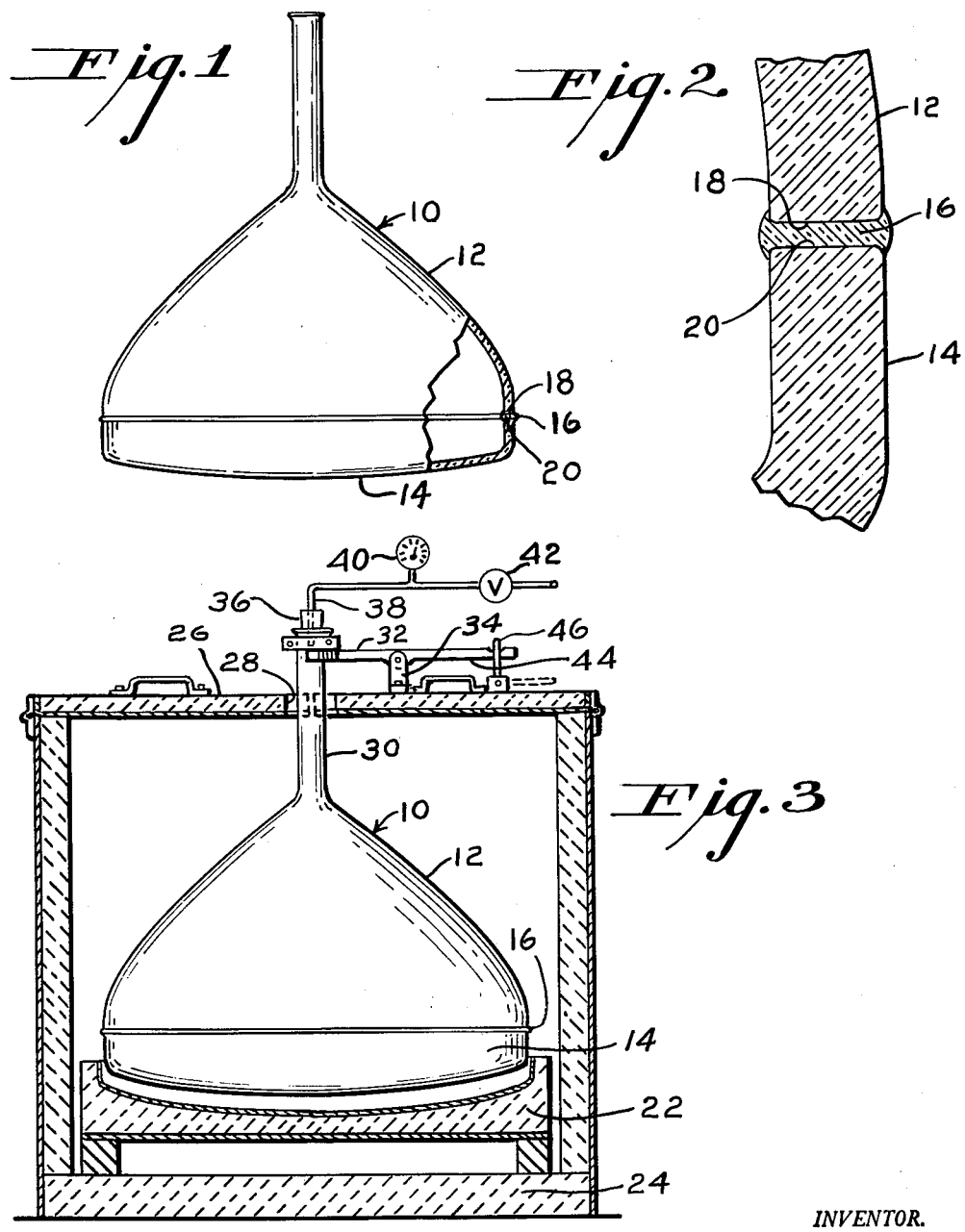
INVENTOR.
STEWART A. CLAYPOOLE
BY Clarence R. Patty, Jr.
ATTORNEY

United States Patent Office 3,058,323
Patented Oct. 16, 1962

3,058,323
METHOD OF SEPARATING DEVITRIFIED GLASS SEALS
Stewart A. Claypoole, Painted Post, N.Y., assignor to Corning Glass Works, Corning, N.Y., a corporation of New York
Filed Mar. 24, 1958, Ser. No. 723,257
4 Claims. (Cl. 65—17)

This invention relates to the separation of parts joined together with a devitrified glass seal. It is particularly adapted to separating, for salvage purposes, the funnel and panel components of a cathode ray tube embodying such a seal. The joining of glass, ceramic, or metal parts, such as cathode ray tube funnels and panels, with a devitrified glass seal is described in my co-pending application, S.N. 562,763 filed February 1, 1956, now Patent No. 2,889,952 and assigned to the assignee of this application. It is there disclosed that parts of a composite article may be initially joined with a vitreous seal in conventional manner, and that the sealing glass may thereafter be devitrified, preferably by further heating at the sealing temperature, to form a strong, hermetic seal between the parts.

This method of sealing has found considerable application particularly in the production of cathode ray tubes adapted to multi-colored television reception. However, in manufacturing such tubes, as well as in other operations involving sealing of component parts, it is frequently desirable, if not essential, to provide an efficient salvage or reclaim process for that portion of the manufactured product which, for one reason or another, is defective.

Prior to development of devitrified glass seals, it was well known to join parts of a composite article with a relatively soft or low melting sealing glass. Parts sealed in this manner could be easily separated by re-heating at the sealing temperature to soften the sealing glass and permit separation by mechanical means.

Characteristically, the rigid crystal structure formed in a devitrified seal fuses or melts only at temperatures considerably higher than the sealing or devitrifying temperature, e.g. on the order of 150° C. higher in the case of many lead-zinc-borate glasses. In an all-glass article, this may be above the temperature at which the parts themselves soften and deform. While this is highly beneficial in most respects, it does render prior separation methods impractical with this type of seal. This is particularly true where glass parts are involved, and creates a need for new separation and/or salvage procedures.

It has been proposed to separate parts sealed in this manner by either sawing through the seal with a diamond saw, or mechanically effecting a fracture in it. The former process is relatively expensive and hence impractical in many instances. The latter may present a serious problem, where glass or ceramic parts are involved, because of the difficulty in restricting the fracture or crack to the sealing material.

It has also been proposed to employ chemical salvage procedures. A co-pending application, S.N. 588,058, filed May 29, 1957, now Patent No. 2,852,352 in the name of Rafael Landron and assigned to the present assignee, is directed to a particularly effective method of removing lead borate sealing glasses from sealing surfaces with nitric acid. This process is particularly applicable once component parts are separated. It may also be utilized in completely dissolving sealing material without prior separation. However, because of the nature of most seals, separation by that process is too time consuming to be practical.

Accordingly, the need for a practical method of separating parts sealed with a devitrified sealing glass has persisted, and it is a primary purpose of the present invention to satisfy this need.

A more specific purpose is to provide a method of separating a cathode ray tube funnel and panel, joined together with a devitrified glass seal, to facilitate their salvage.

The present invention is based on certain discoveries regarding the effect of further thermal treatment on the strength of devitrified glass seals. I have found that, while relatively high temperatures are required to fuse or melt the devitrified material, such a seal may be rendered extremely weak in tension by heating at a temperature on the order of 50° C. above the sealing and devitrifying temperature. I have further found that an all-glass cathode ray tube, embodying a devitrified glass seal that is at least as strong as the glass parts at the sealing temperature, may be readily separated for salvage by internally applied air pressure after treatment at such slightly higher temperatures. The exact nature of the change occasioned in the seal by such heat treatment is not known. It has been observed however, that the seal strength is reduced by a factor of four or more at a critical temperature, and that, after separation, the parts show definite evidence of a fractured crystal structure.

Briefly then the invention provides a method of separating the component parts of an article, said parts being joined together with a devitrified glass seal formed at an elevated sealing temperature, which comprises weakening the seal by heating at least the sealing zone of the article at a temperature above the sealing temperature and placing the seal in tension to separate the parts. In general, a temperature of about 50° C. above the sealing temperature is effective and, with hollow articles, the seal is preferably placed in tension by applying internal air pressure.

By way of illustrating the invention and the manner in which it may be practiced, a specific and preferred embodiment is described in conjunction with the accompanying drawing in which, FIG. 1 is an elevation view of a cathode ray tube partly broken away to show the sealing zone in section, FIG. 2 is an enlarged, fragmentary sectional view of the sealing zone, and, FIG. 3 is an elevational view in section of an apparatus suitable for practice of the invention.

In the drawing FIG. 1 illustrates a typical cathode ray tube envelope 10 composed of funnel 12 and panel 14 with a thin layer of devitrified glass 16 bonded to and joining their respective peripheral sealing surfaces 18 and 20. The sealing zone of tube 10 thus formed is better shown in the exaggerated illustration of FIG. 2.

Details regarding the devitrified glass seal in tube 10, its characteristics and its production may be found in the earlier mentioned Claypoole application. It will also be appreciated that many components of a cathode ray tube, e.g. screen coatings, electrical contacts, electron gun, etc., have been omitted here in the interest of more clearly illustrating the present invention.

In accordance with the present invention, tube 10, or at least the sealing zone of the tube, is thermally treated at a temperature above the sealing temperature, that is the temperature of forming the devitrified seal, to weaken the devitrified glass seal. This thermal treatment may take place in any convenient kiln, lehr or other heating chamber. Tube 10 is supported on a stand or rack 22 located in kiln 24. The latter may conveniently be an ordinary box furnace made up of brick and having radiant heating units (not shown) mounted on the interior surfaces. Kiln 24 is provided with a cover 26 having an opening 28 of sufficient size to allow neck 30 of tube 10 to extend out when the kiln is closed.

A clamp 32 for neck 30 is pivotally mounted in the manner of a lever on standard 34. Neck 30 is also provided with a closure member 36 having an air line 38 extending therethrough and connected through a gauge 40 and valve 42 (both shown schematically) to a source of air pressure (not shown).

By way of more specific illustration, an adaption is described wherein tube 10 is a round, all-glass unit 21 inches in diameter and embodies a seal composed of a lead-zinc-borate glass devitrified at a temperature of 440° C., the customary sealing temperature for television receiving tubes. Tube 10 is placed in kiln 24, heated to a temperature of 490° C., and held at that temperature for about 5 minutes to permit thermal weakening of seal 16. The handle end 44 of clamp-lever 32 is forced down and locked by hold-down member 46 to raise tube 10 an inch or so above support 22 (as shown) and suspend it in this position. This avoids contact of the parts, and possible chipping or fracture from such contact, during and after separation.

An air pressure of 2 p.s.i. is momentarily applied through line 38 to the interior of tube 10. With seal 16 thermally weakened, this pressure is sufficient to force funnel 12 and panel 14 apart along a line of fracture in seal 16. The lateral thickness of seal 16 in this tube is about ¼ inch. By calculation then, the air pressure applied is equivalent to a force of about 42 pounds per square inch of seal. In tubes of different dimensions the applied pressure may be varied to provide equivalent force. The amount of force required will vary somewhat but should be from 20–60 pounds per square inch of seal.

While the optimum temperature of thermal treatment is ordinarily 50° C. above the devitrifying temperature, this may vary somewhat with different glasses. Higher temperature differentials may be used of course, but are undesirable with glass parts because of the tendency for warpage to occur. In any event, optimum conditions may be readily determined in practice.

By way of comparison, attempts were made to work at temperatures of 470°–480° C. in the above specific example. At pressures of about 6–8 p.s.i. random fractures occurred both in the seal and in the glass parts. This indicates seal strength equivalent to that of the parts at such temperatures.

Kiln 24 is then cooled and the separated funnel and panel removed for further salvage operations. The devitrified glass remaining on surfaces 18 and 20 may be removed by the chemical solution process described in the earlier mentioned Landron application.

It will be appreciated that the invention may be practiced in many modified forms. In particular, the heating arrangement would be modified for large scale operations. Also the separating force might be applied in different ways depending on the nature of the article. Furthermore, while the invention has particular value in salvaging cathode ray tube parts, its more general application will be obvious to those skilled in the sealing art.

What is claimed is:
1. A method of separating component parts of an article that are joined together with a devitrified lead-zinc-borate glass seal formed at an elevated glass devitrifying temperature which comprises
   heating at least the sealing zone of the article to a temperature that is about 50° C. above the devitrifying temperature and at which the devitrified glass seal is weakened,
   and applying force to at least one of the component parts to place the seal in tension and thereby separate the parts along a line of fracture in the seal.
2. A method in accordance with claim 1 in which the article is hollow and pressure is applied within the article to separate the parts.
3. A method in accordance with claim 2 in which air pressure equivalent to 20–60 pounds per square inch of seal cross section is applied.
4. A method of separating the funnel and panel of a cathode ray tube, said funnel and panel being joined together with a devitrified lead-zinc-borate glass seal formed at a devitrifying temperature of about 440° C., which comprises heating the sealing zone of the tube to about 490° C. to weaken the seal and applying a pressure within the tube equivalent to about 40 pounds per square inch of seal.

References Cited in the file of this patent
UNITED STATES PATENTS

| | | |
|---|---|---|
| 986,380 | Gillinder | Mar. 7, 1911 |
| 1,259,156 | Stewart | Mar. 12, 1918 |
| 1,351,710 | Warrick | Aug. 31, 1920 |
| 1,592,299 | Howard | July 13, 1926 |
| 1,685,349 | Bailey | Sept. 25, 1928 |
| 1,920,641 | Heichert | Aug. 1, 1933 |
| 2,291,451 | Craig et al. | July 28, 1942 |
| 2,852,352 | Landron | Sept. 16, 1958 |
| 2,884,312 | Kuryla | Apr. 28, 1959 |

OTHER REFERENCES

Glass: The Miracle Maker by C. J. Phillips, published by Pitman Pub. Co., copyright 1941, see page 87, "Effect of Temperature."